(12) United States Patent
Vanone (10) Patent No.: US 9,848,535 B2
(45) Date of Patent: Dec. 26, 2017

(54) HIGH-SECURITY AND LOW-NOISE AGRICULTURAL MACHINE

(71) Applicant: BCS S.p.A., Milan (IT)

(72) Inventor: Fabrizio Omodeo Vanone, Mortara (IT)

(*) Notice: Subject to any disclaimer, the term of this patent is extended or adjusted under 35 U.S.C. 154(b) by 0 days.

(21) Appl. No.: 15/016,031

(22) Filed: Feb. 4, 2016

(65) Prior Publication Data
US 2017/0223897 A1 Aug. 10, 2017

(51) Int. Cl.
| | |
|---|---|
| A01D 75/00 | (2006.01) |
| A01D 69/00 | (2006.01) |
| A01D 75/18 | (2006.01) |
| A01D 69/08 | (2006.01) |
| A01D 34/00 | (2006.01) |
| A01D 101/00 | (2006.01) |

(52) U.S. Cl.
CPC ............ *A01D 75/18* (2013.01); *A01D 34/00* (2013.01); *A01D 69/005* (2013.01); *A01D 69/08* (2013.01); *A01D 2101/00* (2013.01)

(58) Field of Classification Search
CPC ...... A01D 69/06; A01D 69/08; A01D 69/005; A01D 33/082; A01D 75/18; A01D 34/00; A01D 69/03; B60F 3/0007; B60F 11/006; B60K 17/10; B60K 17/16; B60K 25/06; E01H 5/04; E01H 5/098; F16H 47/04; F16H 47/06; F16H 37/04; F16H 37/08; F16H 37/042; F16H 39/14; F16H 2037/0886; F16H 47/02; F16H 39/00; A01B 33/028; A01B 33/082

USPC ......... 37/244; 74/732.1; 172/40–42; 475/75, 475/81, 230
See application file for complete search history.

(56) References Cited

U.S. PATENT DOCUMENTS

| | | | | |
|---|---|---|---|---|
| 3,888,139 | A * | 6/1975 | Orshansky, Jr. | F16H 47/04 475/75 |
| 4,237,748 | A * | 12/1980 | Brimmer | F16H 47/06 74/732.1 |
| 4,519,459 | A * | 5/1985 | Reaume | A01B 33/082 172/125 |
| 4,594,666 | A * | 6/1986 | Cornell | B60W 10/06 477/69 |
| 6,886,646 | B2 * | 5/2005 | Sugimoto | B60K 17/04 180/6.2 |
| 7,954,573 | B2 * | 6/2011 | Jessen | B60F 3/0007 180/6.32 |

(Continued)

*Primary Examiner* — Robert Pezzuto
(74) *Attorney, Agent, or Firm* — Ice Miller LLP (57) ABSTRACT

An agricultural machine includes an engine for power delivery, at least one axle provided with two wheels, a handlebar and a power take-off. The agricultural machine further includes a hydromechanical clutch group interposed between the engine and the at least one axle and a first and a second lever associated with the handlebar controlling the hydromechanical clutch group. The hydromechanical clutch group includes a actuation piston hydraulically controlled by the first and second lever movable between a first raised position, in which the actuation piston imposes to the hydromechanical clutch group the transmission of the motion from the engine to the wheels and to the tool, and a second lowered position in which the actuation piston frees the hydromechanical clutch group by kinematically disconnecting the engine from the wheels and the tool.

10 Claims, 8 Drawing Sheets

(56) References Cited

U.S. PATENT DOCUMENTS

| | | | |
|---|---|---|---|
| 8,313,408 B1 * | 11/2012 | Langenfeld | A01D 69/06 37/244 |
| 9,139,086 B1 * | 9/2015 | Bonny | |
| 9,157,201 B2 * | 10/2015 | Fukano | E01H 5/04 |

* cited by examiner

HIGH-SECURITY AND LOW-NOISE AGRICULTURAL MACHINE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The present invention relates to a high-security and low-noise agricultural machine.

In particular, by low noise it is meant that the machine of the present invention is configured so as to be able to absorb any misalignment or positioning errors of components engaged with each other that can cause strong increases in noise.

In particular, the terms "agricultural machine" refer to a machine comprising an engine, generally endothermic internal combustion operating on petrol or Diesel cycle, a clutch, a gearbox, an axle fitted with wheels, a handlebar of motorcycle type, often called "handles" provided with the controls necessary for the various drives, and a power take-off to which a tool to be used is connected.

By way of example, if such a tool is a cutter adapted to hoe the soil with motor on the side opposite to the operator, the machine is called "walking tractor", otherwise, if the tool is a cutting bar with motor on the operator's side, these machines are called "motor mowers".

Moreover, if the aforesaid handlebar is movable with respect to the power take-off and can rotate up to 180°, allowing the operator to work in a "walking tractor" or "motor mower" configuration, the definition of such machines includes the word "reversible".

Nowadays, for safety reasons, the regulations in force in numerous markets require that if the operator abandons the grip on the handlebars, the machine has to stop, preferably within a limited period of time.

This result can be obtained thanks to the presence of a "security" lever, placed on the handlebars, which the operator during use of the relative machine must keep pressed to keep the machine in operation.

In fact, this lever is connected to the endothermic engine so that, when released, it causes it to shut down.

However, disadvantageously, the shutdown of the engine in case of release of the aforesaid "security" lever does not occur immediately because of the inertia of the engine and of those of the connected kinematic mechanisms.

A consequence of this fact is that the machine can continue to move for some time even after releasing the handlebars by the driver, thus creating a potentially dangerous situation for the user.

Another limitation of the current solution described above lies in the fact that, after leaving the handlebars, and having therefore begun the shutdown process of the engine, in order to continue the work the operator is forced to restart the shutdown engine.

Since most engines of this type have a manual start, the maneuver is not always easy due to the physical effort required.

This unfortunately may induce some operators to tamper with the safety device, locking it in the actuated position, thereby avoiding the shutdown of the engine to avoid the burden of the subsequent restart, but consequently significantly reducing the safety of the machine.

Another limitation of the configuration currently in use and described above mainly affects the machines provided with gearboxes in oil bath.

In fact, in these particular gear machines, the motion it is transmitted via a mechanically actuated clutch through which the entire available power passes.

In order to contain the track width of the machine, reducing the transverse dimensions and allowing the execution of special cultivation work, the diameter of this clutch is rather reduced in relation to the power to be transmitted.

This limited volume available often makes it mandatory to use dry cone clutches often having a sharp drive, high wear and relevant problems of heat dissipation.

In order to reduce the start-up transients, origin of overheating especially with high inertia tools, very stiff springs are often used today which make a mechanical control of the clutch weary and little ergonomic. Furthermore, the manual actuation of a safety lever directly connected to the clutch itself is tiring and unwieldy, having to be maintained for the duration of the work.

Finally, wear is often premature, requiring frequent adjustments of the control and increasing risk of malfunctions with potential safety risks.

BRIEF SUMMARY OF THE INVENTION

To overcome all the drawbacks described above, the Applicant has for a few years marketed a high-security agricultural machine in which, when in use the user leaves the handlebars, the machine stops suddenly while keeping the engine running.

Moreover, advantageously, in this machine of the Applicant the actuation of the controls provided at the handlebars only requires little efforts by the user and there is also a safety mechanism that requires a double action for restarting the machine after leaving the handlebars.

Now, the object of the Applicant is to further improve this innovative product thereof, addressing the problem of reducing noise and decreasing the stopping time.

In fact, in such a machine, as well as in the known ones of the competition, the gear connected to the oil pump is mounted on the shaft of the endothermic engine, and therefore rotates at a high speed.

In this condition of high number of revolutions, even minimum misalignments, positioning or geometry errors of the gears can cause large increases in noise.

The increase of the mass of the machine and the inertia of the tools connected to it can lengthen the stopping time upon leaving the handlebar, which reduces the level of security.

These objects according to the present invention are achieved by providing a low-noise agricultural machine in which the use of a so-called hydromechanical normally disengaged multiple disc clutch is provided, actuated by means of oil under pressure and controlled by two valves with actuating levers connected to each other. The pressurized oil is supplied by a pump, having improved configuration and forming part of the same mechanism, actuated via a molded gear of glass-reinforced polyamide resin technopolymer. The clutch can also act as an automatic brake to reduce the stopping times of both the machine and the tools operated thereby.

Further features of the invention are described in the following claims.

BRIEF DESCRIPTION OF THE SEVERAL VIEWS OF THE DRAWING(S)

The features and the advantages of a high-security and low-noise agricultural machine according to the present invention will become apparent from the following exemplary and non-limiting description, made with reference to the accompanying schematic drawings, in which.

DETAILED DESCRIPTION OF THE INVENTION

With reference to the figures, reference numerals 10, 10' denote an improved agricultural machine according to the present invention.

As shown in FIGS. 1-4, such an agricultural machine 10, 10' comprises a power delivery engine 11, at least one axle 12 provided with two wheels 13, a handlebar 14 and a power take-off 15.

Moreover, the agricultural machine 10, 10' comprises a hydromechanical clutch group 20 interposed between engine 11 and the at least one axle 12, a first "security" lever 16 and a second "clutch" lever 17.

In particular, both said "security" 16 and "clutch" 17 levers are associated with handlebar 14 in a proximal position to that provided for the hands of the user who uses machine 10, 10' and are for the control and selective actuation the hydromechanical clutch group 20.

Preferably, the agricultural machine 10, 10' according to the present invention also comprises a gearbox 51 interposed between the hydromechanical clutch group 20 and axle 12, as well as control means 50 of engine 11 and gearbox 51 also placed at handlebar 14.

In particular, the agricultural machine 10, 10' may include a tool 20, 20' associated with the power take-off 15.

Figure 1:
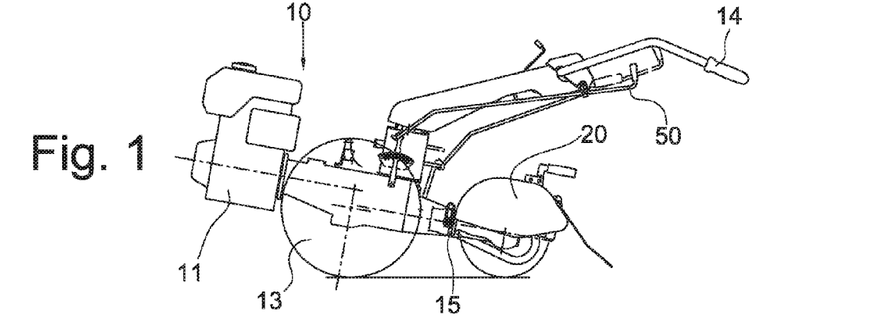
FIG. 1 is a side elevation view of an agricultural machine.
Figures 2, 3:
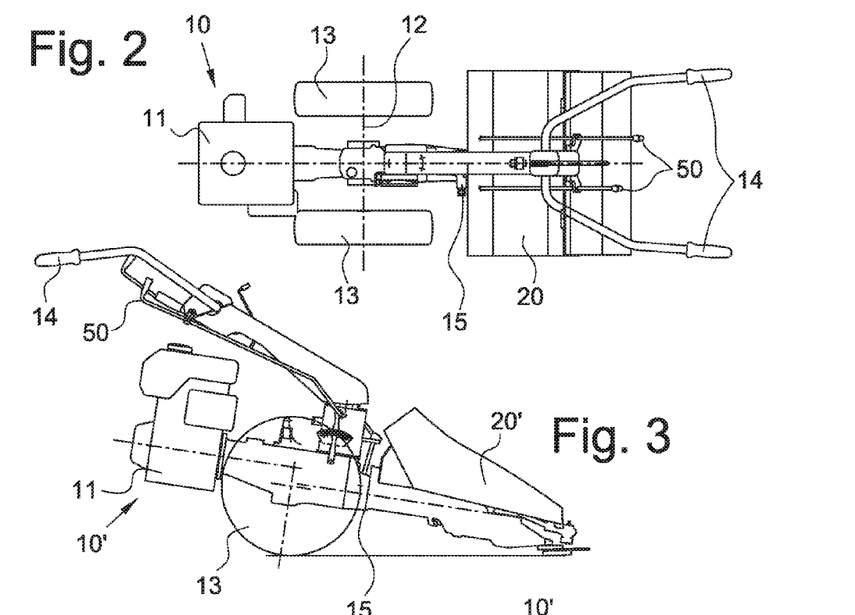
FIG. 2 is a top view of the agricultural machine of FIG. 1.
FIG. 3 is a side elevation view of another machine.
Figure 4:
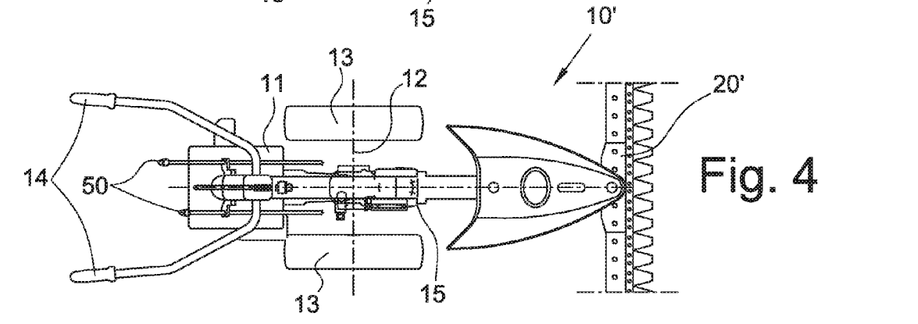
FIG. 4 is a top view of the agricultural machine of FIG. 3.

According to two embodiment examples, said tool 20, 20' may comprise a cutter 20 adapted to hoe the soil, in this case the agricultural machine 10, 10' is a walking tractor 10, as shown in FIGS. 1 and 2, alternatively tool 20, 20' may comprise cutter bars 20' and in this case the agricultural machine 10, 10' is a motor mower 10', as shown in FIGS. 3 and 4.

Moreover, advantageously, handlebar 14, generally of the motorcycle type, can be oriented as desired with respect to the power take-off 15 depending on tool 20, 20' to be used.

As mentioned at the beginning of the description, the agricultural machine 10, 10' comprises a hydromechanical clutch group 20, which is provided with a first element with outer teeth connected to the driving shaft 23, hereinafter called "inner group", and a second bell-shaped element with grooves connected to axle 12, hereinafter called "outer group", directly or indirectly depending on the presence or not of gearbox 51.

In particular, such a hydromechanical clutch group 20 comprises a pack of discs 46 facing each other and alternately connected to the inner group and the outer group, in which these discs 46 are movable to come into contact with each other and transmit, when in contact, the motion from the inner group to the outer group.

In other words, when discs 46 alternately facing and connected to the inner group and to the outer group come into contact with each other, the motion coming from shaft 23 is transmitted, optionally modified by gearbox 51, to wheels 13 and to the power take-off of the work tool 20 and 20'.

Figure 5:
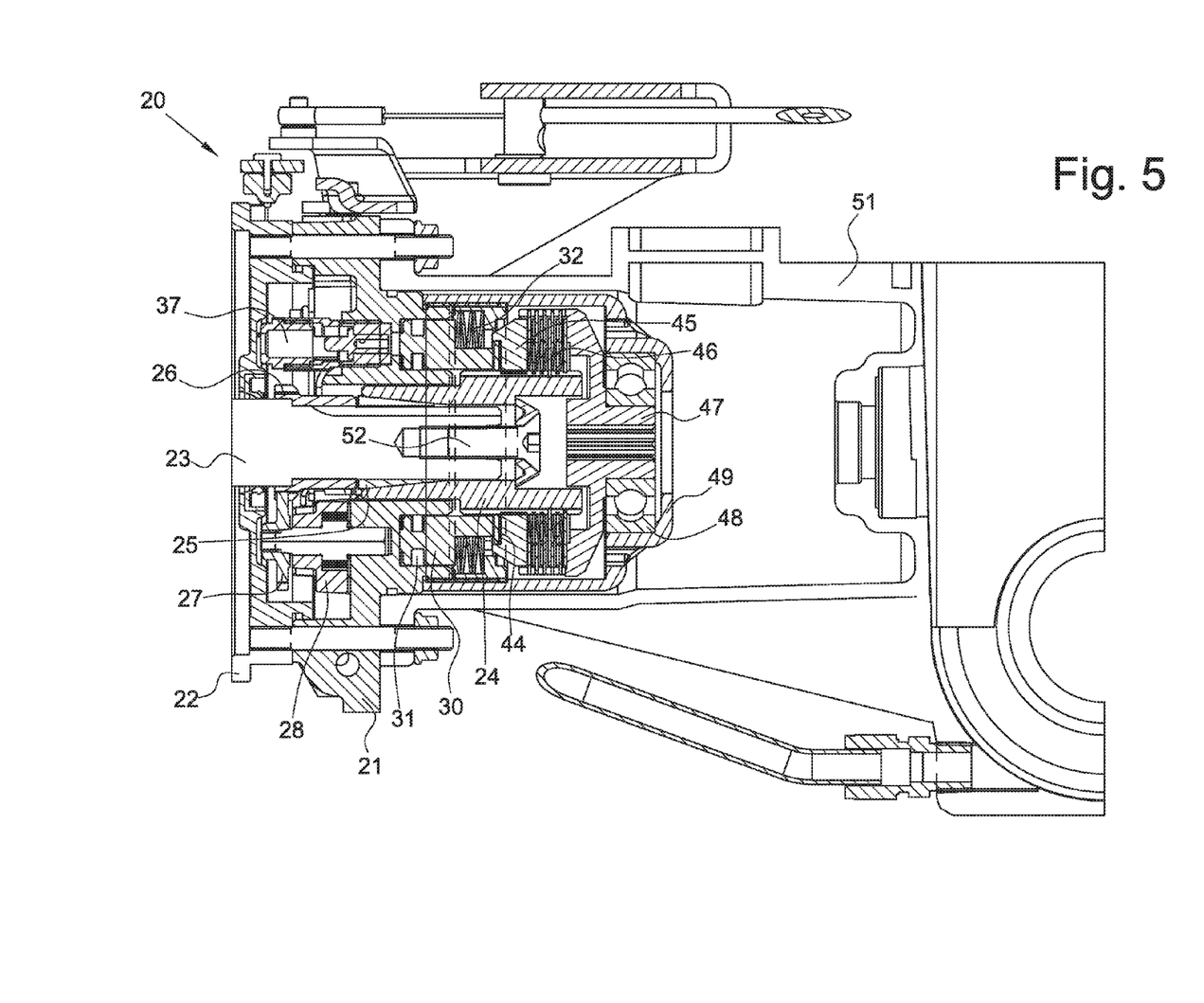
FIG. 5 is a vertical sectional view of the clutch group belonging to a low-noise agricultural machine according to the present invention.
Figure 5A:
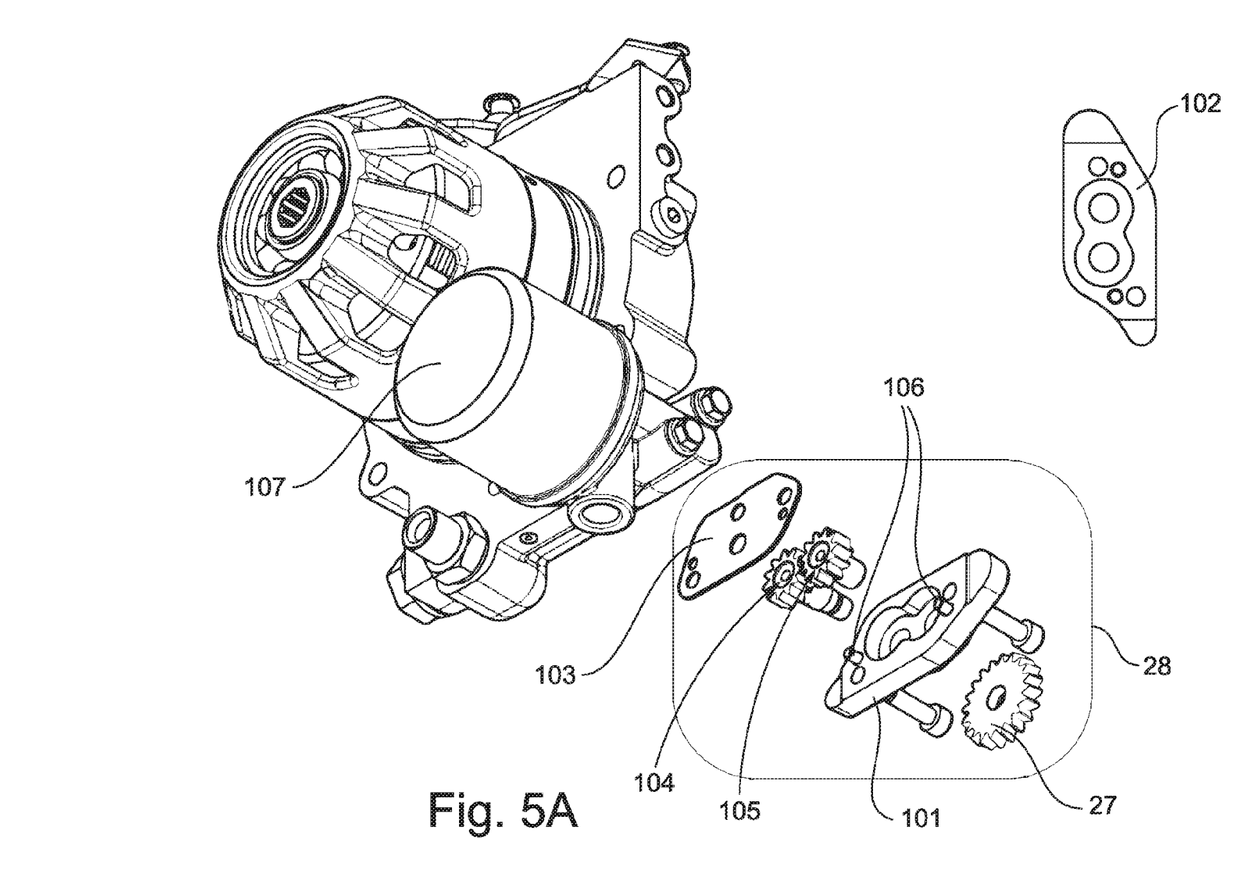
FIG. 5A is an exploded view of the oil pump group according to the present invention.
Figure 5B:
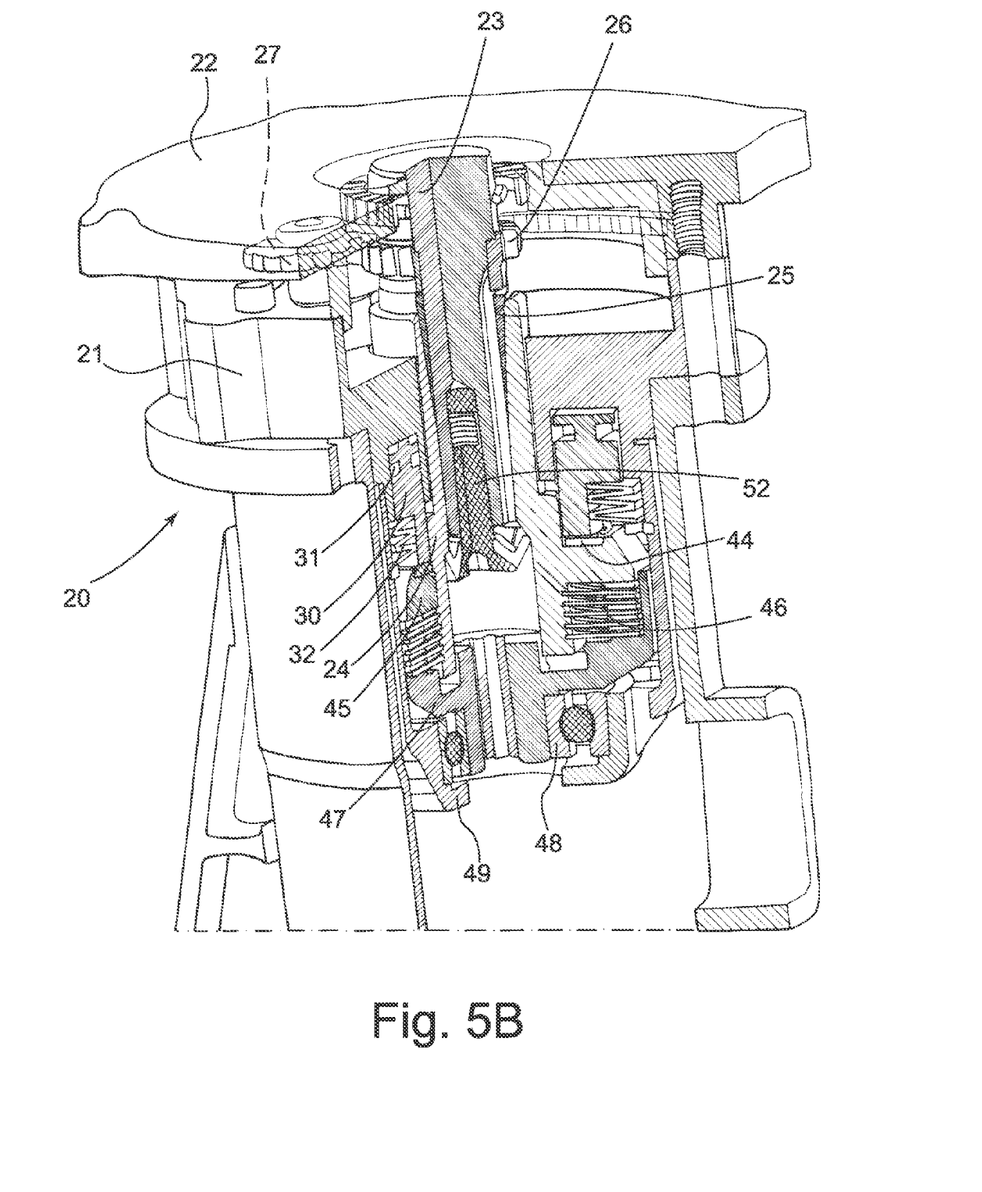
FIG. 5B is a perspective partially exploded view of the clutch group of FIG. 5.

As shown in FIGS. 5 and 5B, the hydromechanical clutch group 20 comprises a movable piston 30 which is hydraulically controllable by the user by acting on the first "security" lever 16 as well as on the second "clutch" lever 17.

In fact, this movable piston 30 is movable between a first raised position, in which discs 46 are uncoupled, and a second lowered position, in which the same discs 46 are coupled to each other.

The hydromechanical clutch group 20 is integral with the usually endothermic engine 11, receives the power through the driving shaft 23, comprises a flange 21 associated with a portion 22 of the engine, a toothed hub 24 rigidly keyed, preferably by means of a screw 52, on the driving shaft 23 itself, and a conical bushing 25, associated with the toothed hub 24, for dragging a first gear 26.

Coupled to the first gear 26, a second gear 27 controls an oil pump 28 for introducing pressurized oil into the housing chamber of piston 30. The oil used for the lubrication of the transmission gears can be put under pressure by the actuation of the mechanism.

This oil pump 28 is generally connected to an oil tank, which may also be the same gearbox, via a pipe optionally provided with a replaceable filter and a magnetic plug 30'.

The oil pump 28 of the present invention, shown in FIG. 5A, includes a pump body 101 having an 8 shaped seat 102 on one side for housing a drive gear 104 and a driven gear 105 and closed by a plate 103.

On the outside of the pump body 101 on the opposite side of plate 103, it comprises an outer actuation gear 27 keyed on the drive gear 104 and meshed with the hydromechanical clutch group 20.

Therefore, this outer actuation gear 27 moves the entire pump.

In particular, this outer actuation gear 27 is made of synthetic material and is obtained by molding of a glass-reinforced polyamide thermoplastic resin technopolymer.

This innovation leads to the advantage of reducing the noise level compared to the common steel gears.

In fact, since this gear 27 is mounted on the shaft of the endothermic engine 11, it revolves at high speed and therefore minimum misalignments, positioning or geometry errors of the teeth can cause a strong increase in the noise level.

Advantageously, due to its high elasticity and hysteresis features, the synthetic resin dampens the noise source at the origin.

Also, the addition of glass allows the gear to withstand, without decrease of the mechanical features, even if immersed for a long time in the high-temperature oil.

It should also be noted that the limited power and the absence of shocks allows effectively sizing the gear and that with an initial investment for the molding equipment, the component does not require any further treatment.

The pump body 101 is made of hot stamped leaded steel.

Industrial and higher quality benefits are obtained in this way compared to cast iron and greater wear resistance than the aluminum alloy solutions of known embodiments.

Moreover, the addition of lead to steel facilitates the processing on machine tool and automatically provides an inherent lubrication during operation.

As mentioned above, the internal machining 102 of the seat in the pump body is shaped as an "8" and is edge-free.

Such an embodiment, in addition to being easier to execute, prevents any clearance or misalignments from causing interference between gears and seat.

Seat 102 is closed by a hardened metal plate 103 so to be a cost-effective and wear resistant component.

The pump gears, i.e. the drive 104 and driven 105 gears, are supported only by the pump body and have shafts working overhanging in the pump body 101 and leaning against said plate 108.

In this way, the following two advantages are obtained.

It is prevented that the shafts, together with the positioning pins 106, make the positioning of the pump hyperstatic, a configuration that can cause overheating and seizing, and also in this way, the oil pump is mechanically isolated from the rest of the mechanism to which it is connected only via the synthetic outer gear 27.

Therefore, any faults of the pump cannot cause any damage to the remaining components, making the repair simpler and more economical.

Finally, the pump is protected by a replaceable cartridge filter 107 with total flow rate on the suction (see FIG. 5A).

Figure 5C:
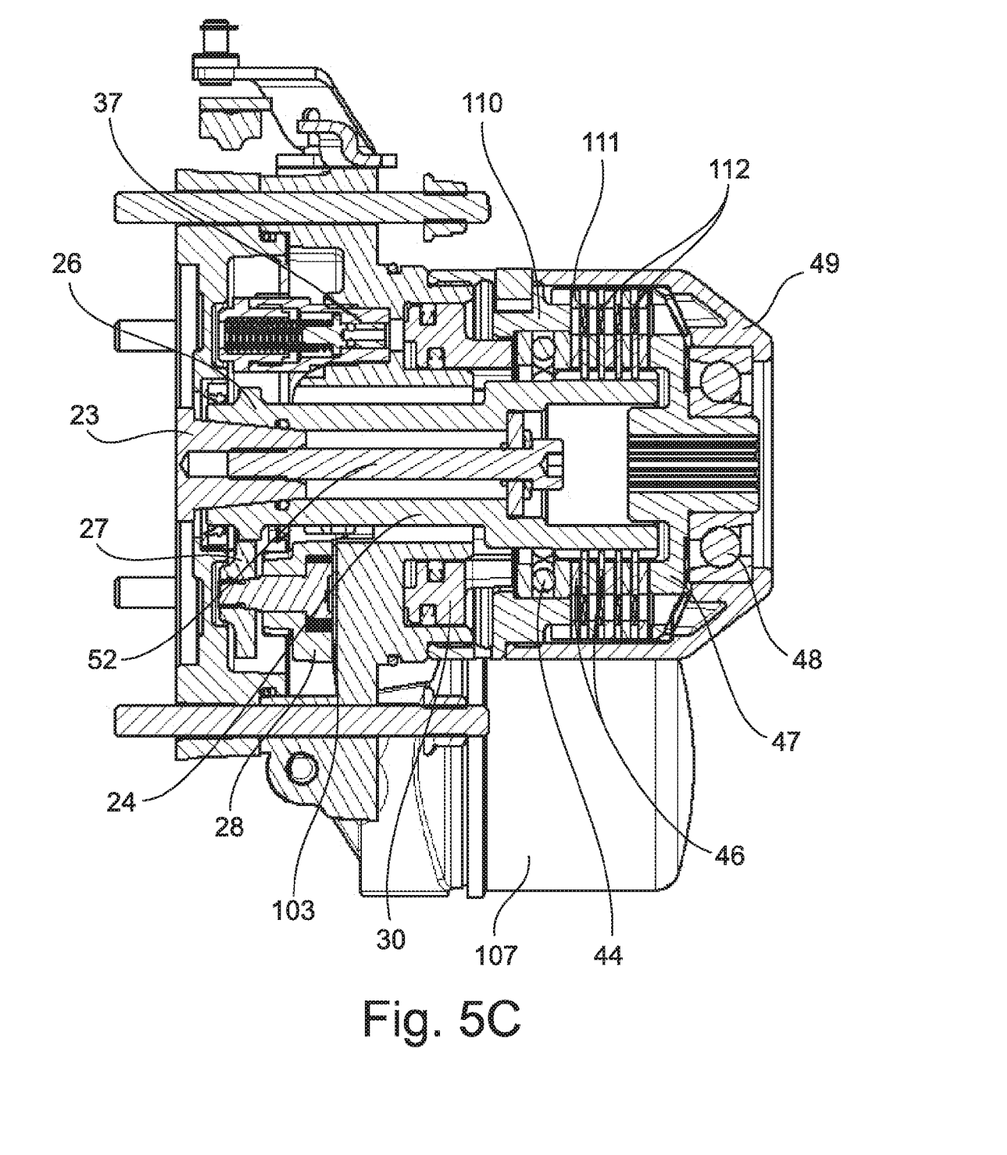
FIG. 5C is a sectional view of the clutch group of FIG. 5 in the evolved embodiment which includes the automatic brake function.

Preferably, piston 30 is associated with sealing gaskets 31 and there may be at least one preloaded spring 32 which returns piston 30 to a raised initial position in which it does not constrain discs 46 in mutual contact. The same spring or set of springs 112 may be arranged between the clutch discs such as shown in FIG. 5C. In this configuration, there is an intermediate element 110 consisting of a ring of wear-resistant material, for example hardened steel. When the discs are not constrained in mutual contact, the spring or set of springs 112 pushes disc 111 against ring 110, braking the loads actuated by the clutch, both the machine and the tool.

According to a preferred embodiment, the hydromechanical clutch group 20 comprises a thrust bearing 44 and a disc pusher 45 associated below piston 30, wherein such a disc pusher 45 is movable under the action of piston 30 to compress the pack of discs 46 alternately connected to the inner group and to the outer group.

Figure 6:
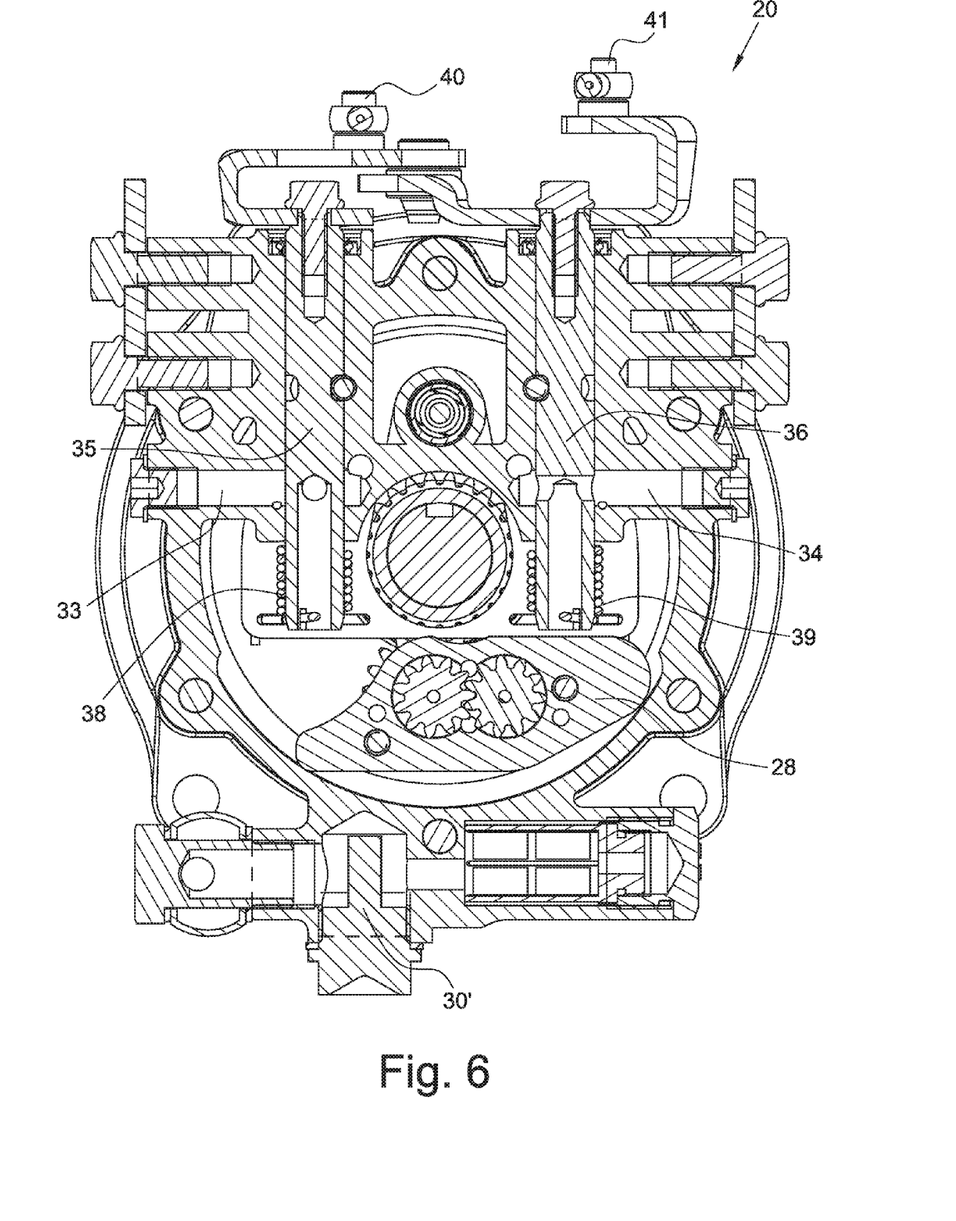
FIG. 6 is a horizontal sectional view of the clutch group of FIG. 5.
Figure 7:
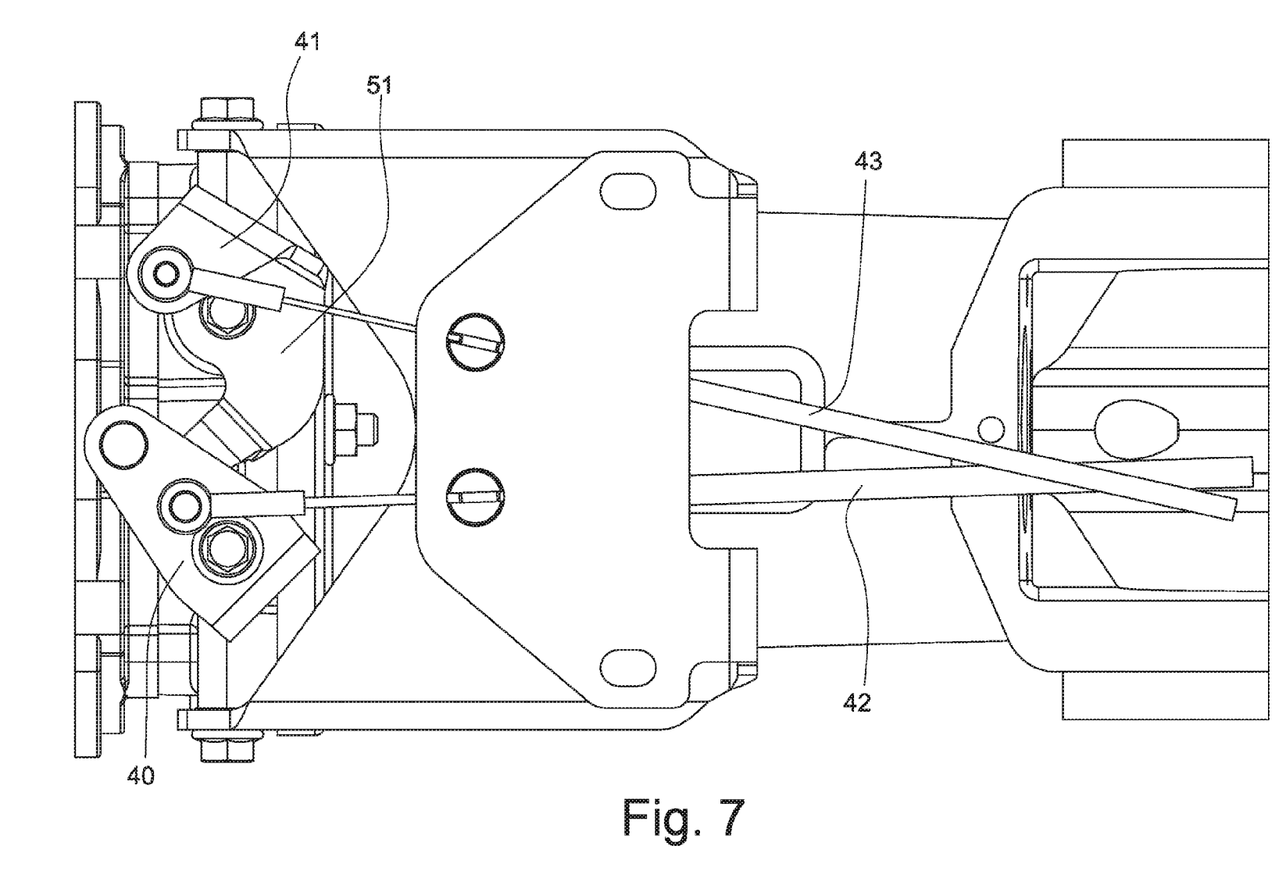
FIGS. 7 and 8 are schematic views of other components of an agricultural machine according to the present invention.
Figure 8:
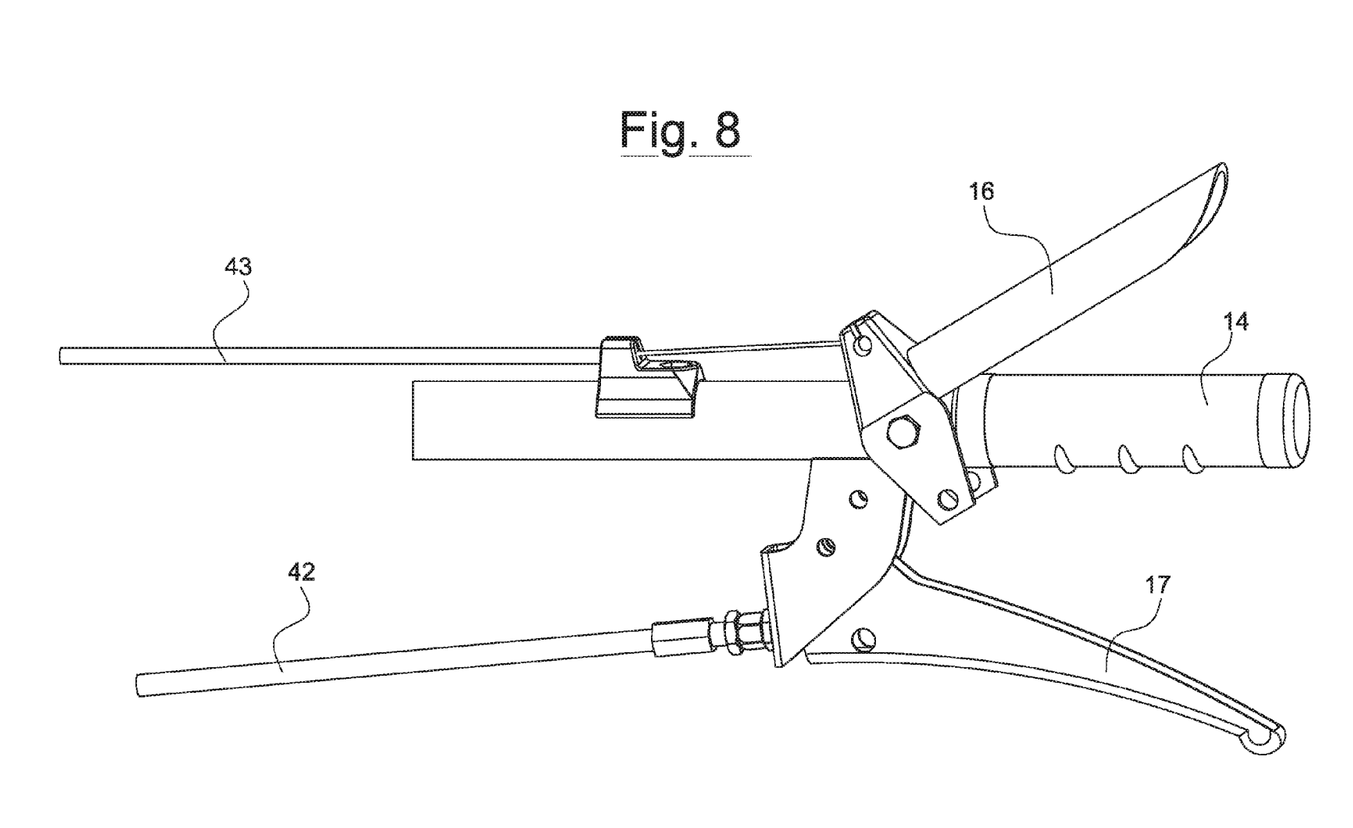

As shown in FIG. 5B, the housing chamber of piston 30 is in communication, in addition to the delivery conduit of the pressurized oil, with a drain via a pressure relief valve 37 and two holes 33, 34, shown in FIG. 6, intercepted selectively by two rotary or otherwise movable distributors 35, 36.

In particular, such two rotary distributors 35, 36 are according to the present invention driven in rotation respectively by the first "security" lever 16 and by the second "clutch" lever 17.

In particular, such two rotary distributors 35, 36 are associated with springs 38, 39 and respectively connected to the second "clutch" lever 17 and the first "security" lever 16 and by two actuating levers 40, 41 and flexible cables 42, 43.

As seen in FIG. 6, the two springs 38, 39 return the two rotary distributors 35, 36 to an initial position such that a rotary distributor 35, associated with the second "clutch" lever 17, occupies hole 33 while the rotary distributor 36 associated with the "security" lever 16, frees hole 34.

By actuating said "security" lever 16 and the second "clutch" lever 17, a rotation is imparted to the relative rotary distributors 35, 36 in which the rotary distributor 35 associated with the second "clutch" lever 17 frees hole 33, while the rotary distributor 36, associated with the "security" lever 16, occupies hole 34.

The outer group includes a bell 47 integral with axle 12, a bearing 48 associated with bell 47 and a casing 49 of bearing 48.

Finally, a movable cam 51 is provided, associated with lever 40 connected to the second "clutch" lever 17 of selective engagement of lever 41 connected to the first "security" lever 16.

In particular, this movable cam 51 is shaped in such a way as to make the first "security" lever 16 not operable without first actuating the second "clutch" lever 17.

It is easy to understand the operation of the device object of the invention.

The agricultural machine according to the present invention, as described above, before starting the main engine 11 has the following conformation.

The oil pump 28 is stopped, and therefore it does not introduce the pressurized oil in the chamber of piston 30 and springs 32, 38 and 39 respectively constrain piston 30 in the raised position and the rotary distributors 35, 36 and in a position to occupy hole 33 and free hole 34.

In particular, hole 33 associated with the second "clutch" lever 17 is closed while hole 34 associated with the first "security" lever 16 is open.

After the starting of engine 11, the oil pump 28 provides to introduce the pressurized oil in the chamber of piston 30 which, however, does not move from said raised position due to the open hole 34 associated with the first "security" lever 16 from which the oil just introduced comes out.

In order to operate the machine, the user must act in succession on the second "clutch" lever 17 and on the first "security" lever 16.

In this condition, the oil pump 28 introduces pressurized oil in the chamber of piston 30 while hole 33 associated with the second "clutch" lever 17 is open and hole 34 associated with the first "security" lever 16 is closed.

Even in this condition, therefore, machine 10, 10' does not move since the pressurized oil injected into the chamber of piston 30 does not push piston 30 due to the open hole 33 associated with the first "clutch" lever 17 from which the oil just introduced comes out.

From this configuration, proceeding to release said first "clutch" lever 17, preferably gradually as during the normal use of cars and/or motorcycles, also hole 33 is closed, thereby forcing the oil to remain in the chamber of piston 30.

At this point, the pressure in the chamber of piston 30 increases, in particular up to the value allowed by the relief valve 37, pushing piston 30 to the lowered position and thus making discs 46 come into contact.

In this condition, therefore, that is, with "clutch" lever 17 released and "security" lever 16 actuated, the motion is transmitted from engine 11 to wheels 13 and possibly to the tool.

In order to actuate gearbox 51 it is sufficient to act on the "clutch" lever 17, change gear and then release the "clutch" lever 17 itself while keeping the "security" lever 16 actuated.

If the user releases, for any reason, the handlebars starting from the condition described above of machine 10, 10' in advancement, and thus releases the "security" lever 16, spring 39 will force a rotation to the relevant rotary distributor 36 to open hole 34.

In such a configuration, the pressurized oil contained in the chamber of piston 30 will flow quickly to the outside from such a hole 34, thus suddenly reducing the pressure acting on piston 30 which will move to the raised position by the effect of spring 32 or of springs 112, thus decoupling the contact of discs 46.

In doing so, then, leaving the handlebars completely stops the machine while the engine keeps running.

Advantageously, the stopping of the machine is substantially instantaneous independent of the associated inertias, since the engine remains in fact turned on.

The configuration shown in FIG. 5C reduces the stopping times due to the braking action incorporated in the clutch group, while maintaining a high degree of safety even in the presence of higher inertias.

Finally, to proceed to resume work after releasing the handlebars, a dual action is required that involves having to operate the "clutch" lever 17 and then lower the "security" lever 16.

In fact, due to cam 41, it is not possible to act, with machine stopped, either on or off, on the "security" lever 16 without having previously operated the "clutch" lever 17.

The above controls, i.e. the "security" lever 16 and the "clutch" lever 17, are advantageously smooth to operate and ergonomic, having to act only on a hydraulic distributor.

Since the clutch is in an oil bath, it allows a better heat dissipation and more gradual gear changes without the need for dimensional increases or structural modifications to the machine, which thus maintains all of its features unchanged.

In fact, there is no change in the arrangement and logics of the controls compared to other solutions of general use, which minimizes the risks associated with the inadequate training of users.

The possibility of obtaining an automatic braking effect of the machine and tool connected to the clutch minimizes the stopping time in case of abandonment of the driving position by the user.

Finally, multiple advantages are obtained thanks to the innovative pump group among which the reduction of noise while maintaining the same performance.

It has thus been seen that an improved agricultural machine according to the present invention achieves the objects described above.

The improved agricultural machine of the present invention thus conceived can be subjected to numerous modifications and variants, all falling within the same inventive concept; moreover, all details may be replaced with technically equivalent elements. In the practice, the materials used as well as their sizes may be whatever, according to the technical requirements.

The invention claimed is:

1. An agricultural machine comprising an engine for power delivery, at least one axle provided with two wheels, a handlebar and a power take-off, said agricultural machine further comprising a hydromechanical clutch group interposed between said engine and said at least one axle and a first and a second lever associated with said handlebar controlling said hydromechanical clutch group, said hydromechanical clutch group comprising an actuation piston hydraulically controlled by said first and second lever movable between a first raised position, in which said actuation piston imposes to said hydromechanical clutch group a transmission of a motion from the engine to the wheels and to a tool, and a second lowered position in which said actuation piston frees said hydromechanical clutch group by kinematically disconnecting said engine from said wheels and said tool, there being provided a device for braking the agricultural machine and the tool with said hydromechanical clutch group disengaged, there being provided an oil pump for introduction of pressurized oil into a housing chamber of said piston, said oil pump comprising a pump body having on one side an 8-shaped seat for accommodating a drive gear and a driven gear and closed by a plate, said oil pump on an outside of said pump body on an opposite side of said plate comprises an outer actuation gear keyed on said drive gear and engaged with said hydromechanical clutch group.

2. An agricultural machine according to claim 1, characterized in that said pump body is made of hot stamped leaded steel.

3. An agricultural machine according to claim 1, characterized in that said outer actuation gear is made of synthetic material by molding of a technopolymer.

4. An agricultural machine according to claim 1, characterized in that said oil pump further comprises a replaceable cartridge filter.

5. An agricultural machine according to claim 1, characterized in that said hydromechanical clutch group comprises:
   an inner group associated with a driving shaft, and
   an outer group associated with said at least one axle; and
   a pack of discs alternately facing each other and connected to said inner group and outer group; said pack of discs being movable so as to come into contact with each other and transmit a motion from said inner group and said outer group based on a position of said piston; when said piston is in a first raised position, said pack of discs are uncoupled; when said piston is in a second lowered position, said pack of discs are coupled.

6. An agricultural machine according to claim 5, characterized in that said inner group comprises a toothed hub keyed rigidly by a screw on said driving shaft, a conical bush associated with said toothed hub for dragging a first gear, said outer actuation gear of said oil pump being coupled to said first gear for controlling the introduction of pressurized oil in the housing chamber of said piston.

7. An agricultural machine according to claim 6, characterized in that said piston is associated with sealing gaskets and preloaded springs to operate an automatic brake causing the pack of discs to act on a contrast element.

8. An agricultural machine according to claim 7, characterized in that said housing chamber of said piston is in communication with a drain through two holes, selectively intercepted by two rotary distributors and through a pressure relief valve, said two rotary distributors being controlled in rotation by said first and second lever.

9. An agricultural according to claim 8, characterized in that said two rotary distributors are associated with springs and connected to said first and second lever via two levers and flexible cables.

10. An agricultural machine according to claim 1, wherein said tool comprises one of a cutter adapted to hoe soil and cutter bars and tools for mowing and shredding plants.

* * * * *